United States Patent [19]
Hughes

[11] Patent Number: 6,147,748
[45] Date of Patent: Nov. 14, 2000

[54] TRACKING SYSTEM

[75] Inventor: Edward Benjamin Hughes, Teddington, United Kingdom

[73] Assignee: The Secretary of State for Trade and Industry in Her Britannic Majesty's Government of the United Kingdom of Great Britain and Northern Ireland, London, United Kingdom

[21] Appl. No.: 09/173,837

[22] Filed: Oct. 16, 1998

[30] Foreign Application Priority Data

Oct. 17, 1997 [GB] United Kingdom ................... 9722068

[51] Int. Cl.$^7$ ........................................ G01B 9/02
[52] U.S. Cl. .......................... 356/4.09; 356/358; 356/349
[58] Field of Search .................. 356/4.09, 358, 356/349

[56] References Cited

U.S. PATENT DOCUMENTS

| | | | |
|---|---|---|---|
| 3,559,937 | 2/1971 | Paine et al. | 248/183 |
| 3,665,283 | 5/1972 | LeGall | 318/649 |
| 4,714,339 | 12/1987 | Lau et al. | 356/4.09 |
| 5,779,187 | 7/1998 | Dulat et al. | 244/3.16 |

FOREIGN PATENT DOCUMENTS

19611595 A1 3/1996 Germany .

OTHER PUBLICATIONS

Modeling Gimbal Axis Misalignments and Mirror Center-Offset in a Single–Beam Laser Tracking System, Zhuang, et al., International Journal of Robotics Research, vol. 14, No. 3, Jun. 1995, pp. 211–224.

Real–Time Contactless Measurement of Robot Pose In Six Degrees of Freedom, Prenninger et al., 8252 Measurement, 14 (1995) Jan., No. 3/4, Amsterdam, NL, pp. 255–264.

*Primary Examiner*—Robert H. Kim
*Attorney, Agent, or Firm*—Thomas, Kayden, Horstemeyer & Risley, L.L.P.

[57] ABSTRACT

A tracking system is provided for tracking while determining the position of a point relative to a datum and includes a carriage (4) rotatably mounted on a frame (1) and which can rotate around a precision sphere (2). An interferometer (16) is mounted so as to rotate with the carriage (4), such that a mechanical center of rotation of the device and the measurement datum of the interferometer coincide at the same point.

13 Claims, 6 Drawing Sheets

TRACKING SYSTEM

FIELD OF THE INVENTION

The present invention relates to laser tracking for use, for example, in distance measurement, co-ordinate measurement tri-lateration, multi-lateration.

BACKGROUND OF THE INVENTION

In some applications, it is necessary to measure, by interferometry, absolute distance or displacement of a moving target from a fixed reference point. Current laser tracker systems use a gimbal mounted mirror to steer the interferometer beam to follow the moving target (see FIG. 1). In practice, the moving target is provided with a retro-reflector which reflects the laser beam back towards the tracking system Movement of the target along the interferometer axis is sensed by the interferometer—the interferometer axis being the measurement beam. Any component of the target's motion that is perpendicular to the interferometer axis causes the position of the returned beam to change. This change in position is sensed using a conventional position sensitive detector (PSD) to provide error signals which indicate the amount of movement which has occurred in two orthogonal axes. The system not only obtains a measure of the movement of the target along the interferometer axis but also redirects the interferometer beam to follow the target as the target moves. In this way tracking of the target can be achieved on a continuous basis.

The laser tracker relies on there being a fixed point somewhere within the system that can be used as a datum for distance or displacement measurement. If this datum is ill-defined or moving, then measurement errors will result.

The problem with the above-mentioned method of beam steering is that the measurement datum is defined by a number of mechanically un-related systems. These are the two axes of rotation, the plane of the reflection mirror and the point of reflection of the laser beam from the mirror.

Defining a perfect datum from these parts requires:

the two rotation axes to be aligned such that they intersect at a point;

the point of intersection of the axes to lie on the plane of the mirror;

the steered laser beam to be reflected off the mirror at the point of intersection of the rotation axes and the plane of the mirror.

If any of these conditions is not met then the resulting datum is not a point but is contained within a volume. This leads to distance or displacement measurement error.

To reduce distance measurement errors to below the 1 $\mu$m level requires all these alignments to be made better than 1 $\mu$m. In practice this is difficult if not impossible to achieve and maintain.

SUMMARY OF THE PRESENT INVENTION

The present invention seeks to provide improved tracking accuracy.

According to an aspect of the present invention, there is provided a tracking system for tracking or determining the position of a point relative to a datum including a carriage rotatable around a spherical or circular guide and a displacement measuring device mounted on the carriage and rotatable therewith.

The displacement measuring device is preferably an interferometer.

According to another aspect of the present invention, there is provided a tracking system constructed in such a way as to define the mechanical center of rotation and the measurement datum to coincide at the same point. That point is the center of a precision sphere.

According to another aspect of the present invention, there is provided a tracking system constructed such that the force on the mechanical center of rotation and the measurement datum is kept constant as the system tracks a moving target. In this way, the measurement datum does not movie.

DESCRIPTION OF THE DRAWINGS

An embodiment of the present invention is described below, by way of example only, with reference to the accompanying drawings, in which.

DESCRIPTION OF THE PREFERRED EMBODIMENT

Figure 1:
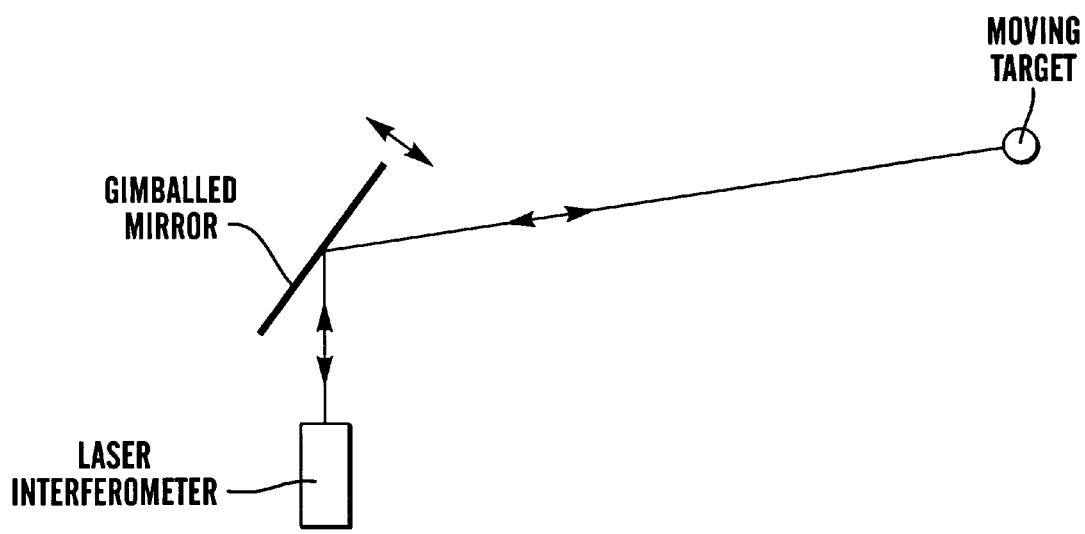
FIG. 1 is a schematic diagram of a prior art tracking system.
Figure 2:
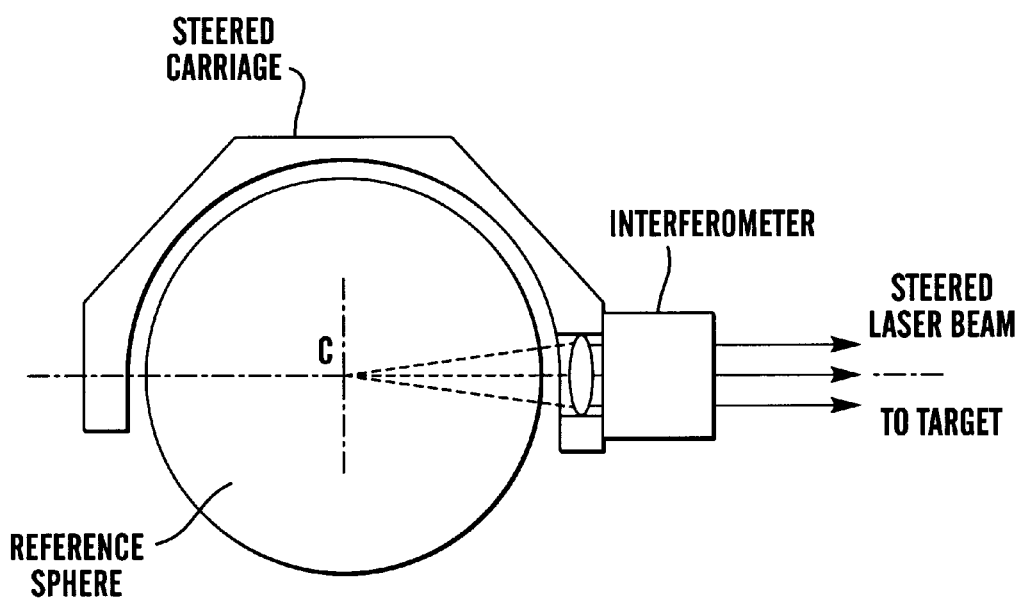
FIG. 2 is a schematic diagram of a preferred embodiment of tracking system.

An example of the preferred embodiment of tracking system can be seen in FIG. 2 in schematic form. There is provided a reference sphere made of alumina around which there is mounted a steerable carriage which is free to rotate about the center C of the sphere. An interferometer is mounted on the steerable carriage so as to be moved therewith. Steering is achieved using motors which rotate the carriage around the center Point C, as will become apparent in the description of the preferred embodiments given below.

The interferometer measurement beam passes from the interferometer through a lens to the reference sphere. It is reflected by the sphere back along the same path. The beam then passes through the interferometer to a target to be tracked. At the target, there is provided a retro-reflector which reflects the beam back towards the interferometer where it interferes with the interferometer reference beam The interference is analysed in the conventional manner to determine displacement along the interferometer axis. Additionally, any movement of the target and thereby of the retro-reflector perpendicular to the interferometer axis causes the position of the returned beam position to change. This change in position is sensed by a PSD to determine the nature of the movement and hence to steer the interferometer axis towards the new target position.

The distance or movement measured by the interferometer is referenced to the center C of the sphere by focusing the beam onto the center of the sphere. The design of the interferometer is such that residual motion of the carriage/interferometer along the axis of the steered beam is self-compensating. This will become apparent below.

As described, the tracking system (not shown) incorporates a beam position sensor of conventional type to measure the displacement of the interferometer beam returned from the moving target. A feedback control system, of conventional type, is provided to enable the tracking system to follow the moving target.

Two angle encoders can be provided to give azimuth and elevation information, such that the laser tracker can be used for polar (r, θ, φ) coordinate measurement.

The preferred embodiment provides the following advantages:

Reduces distance measurement errors due to the steering mechanism to the order of the precision of the sphere; which can be less than 50 nm.

Only requires one precision component—the sphere. Extremely high quality spheres are relatively easy to make and readily available.

Self-compensates for residual motion along the measurement axis.

This example of a high accuracy laser tracking system can be modified as follows:

instead of focusing on the center of the sphere, the beam could be focused onto the surface of the sphere. In this way, a reference to the center of the sphere is maintained due to the constant radius of the precision sphere;

the interferometer can measure either absolute distance or relative displacement;

the sphere could be replaced by any other guide which provides two dimensions or even one dimensional rotation. One dimensional rotation could be provided, for example, by a cylindrical guide of circular axial cross-section.

The specific embodiments shown in FIGS. 3 to 7 use the concept described with reference to FIG. 2. In other words, in order to achieve the very low beam steering mechanism induced displacement measurement error, the mechanism is implemented using a precision sphere. The carriage carrying the interferometer is mounted on the sphere and free to rotate about the center of the sphere. The center of the sphere is also used as the measurement datum for the interferometer.

Figure 3:
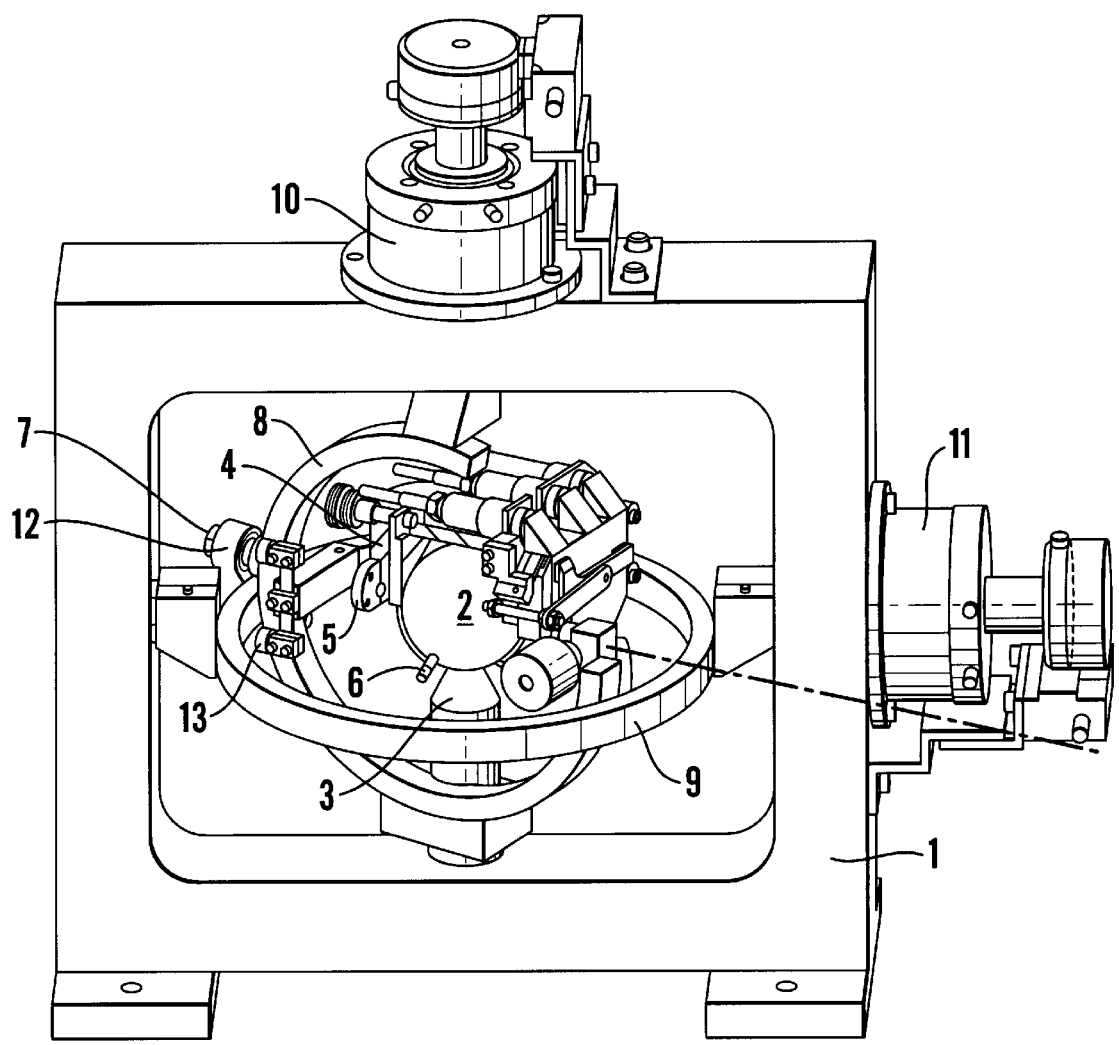
FIG. 3 is a perspective view of the preferred embodiment of laser tracking station incorporating the system shown in FIG. 2.

FIG. 3 shows a design for a tracking station. It consists of a rigid square frame 1 which supports the mechanisms. A precision sphere 2—a Class 5 co-ordinate measuring machine (CMM) reference ball—is supported centrally on a spigot 3. A carriage 4, shown in section in FIG. 3. is supported on the sphere on three pads 5 with spring loaded pads 6 placed symmetrically beneath the sphere to hold the carriage on the sphere when the carriage is tilted forwards or backwards.

A peg 7 rigidly links the carriage to the drive mechanism. The carriage is rotated in two orthogonal planes about the center of the sphere by rotating the two yokes 8 and 9 using two direct-drive dc servo motors 10 and 11. The driving force is transferred from the yoke to the peg via a ball race mechanism 12 and 13 which pinches each yoke. The mechanism is designed to allow the carriage to rotate in the two orthogonal planes without rolling about the measurement axis.

Figure 4:
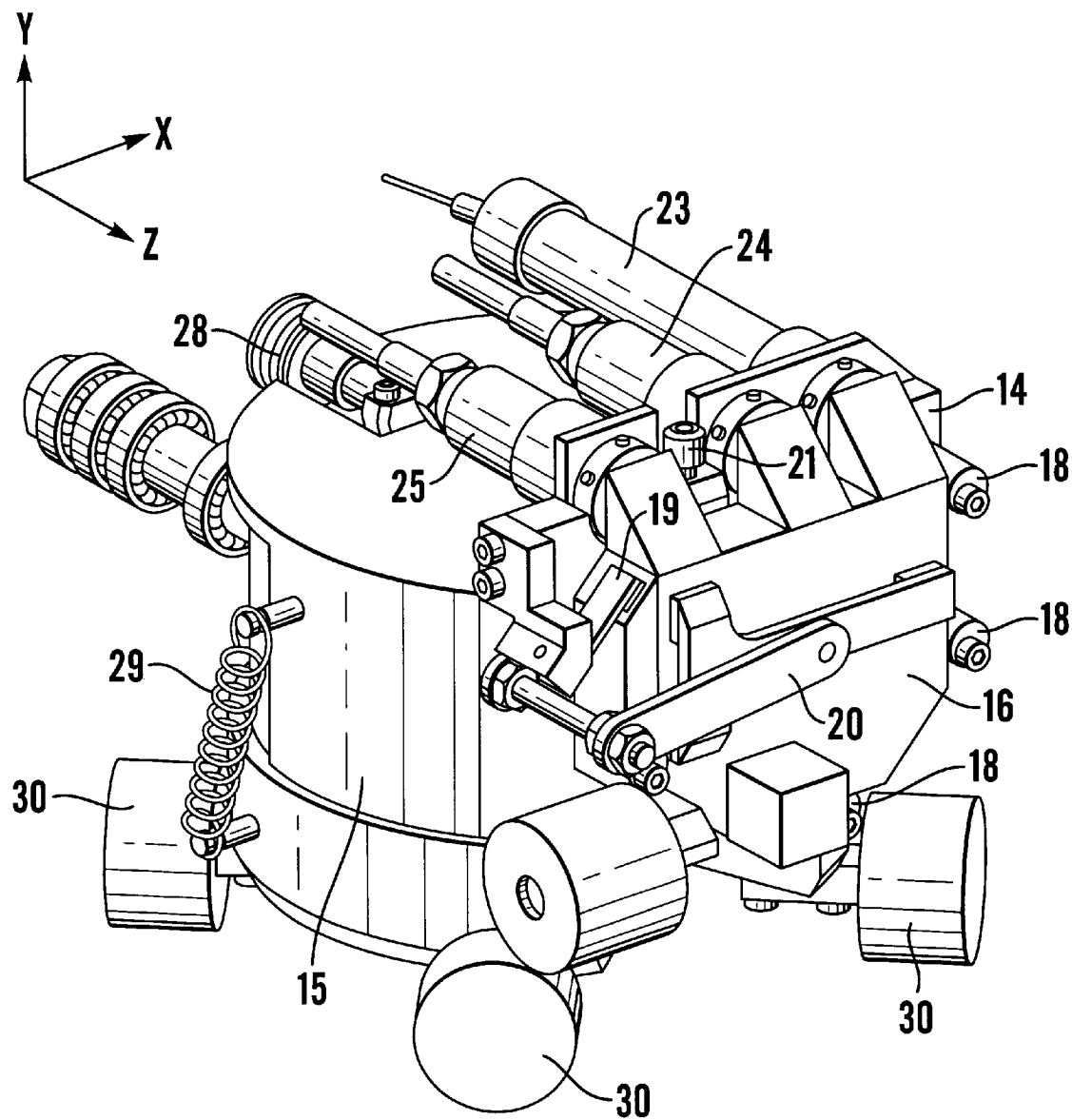
FIG. 4 is an enlarged view of the carriage of the tracking station shown in FIG. 3.
Figure 5:
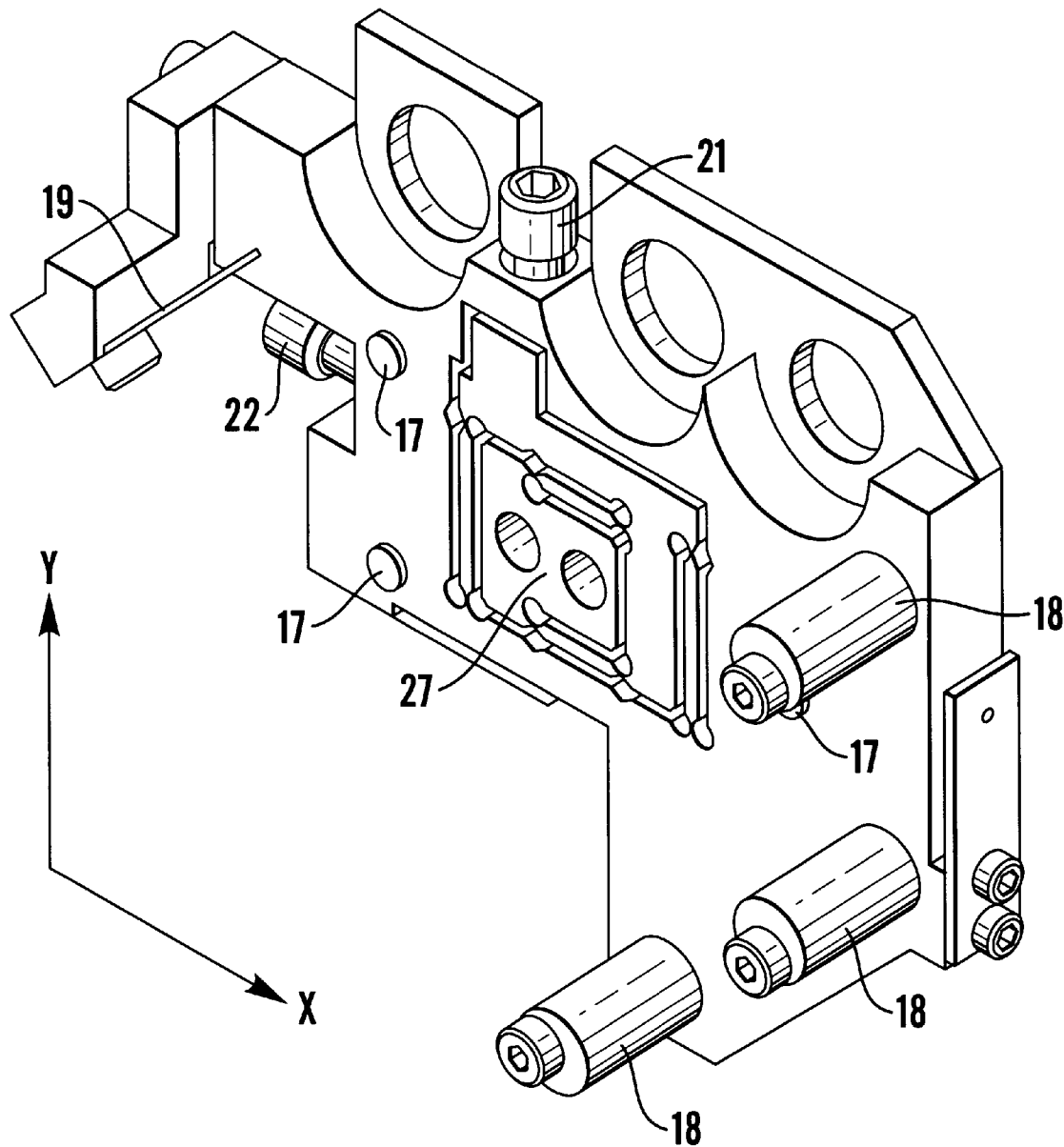
FIG. 5 is a perspective view of an X-Y co-ordinate flexure stage of the carriage of FIG. 4.
Figure 6:
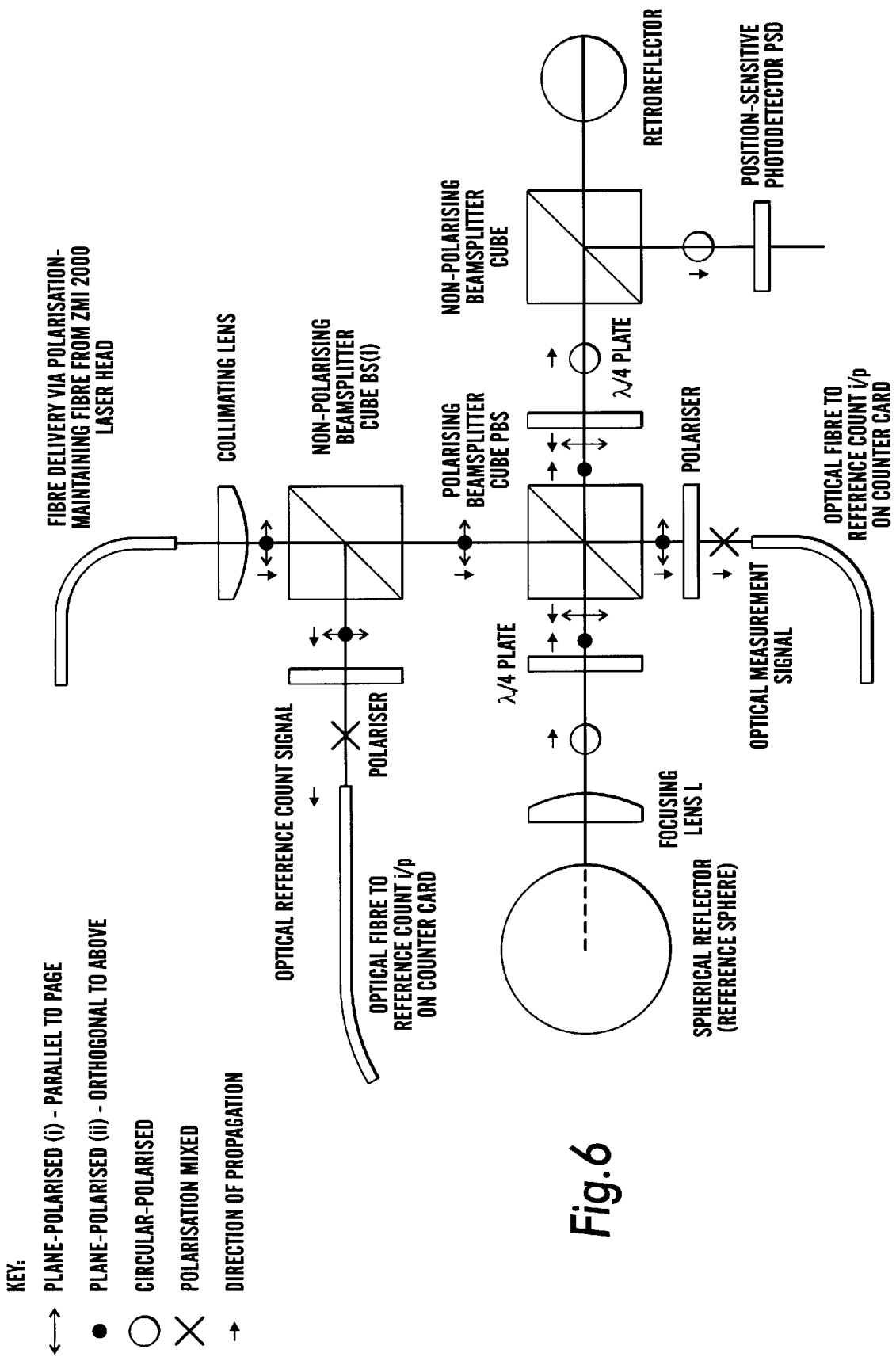
FIG. 6 is a schematic diagram of the preferred interferometer for the tracking station of FIG. 3.

FIG. 4 shows a detailed view of the carriage with the interferometer attached. The carriage incorporates an x-y translation stage 14, which is shown in more detail in FIG. 5, and a z translation stage. Together, these stages allow alignment of the interferometer measurement axis with respect to the reference ball center.

The interferometer block 16 is kinematically located on three raised pads 17 on the flexure stage and three cylindrical cams 18. It is held in place by strip springs 19 and 20. The cams and flexure stage allow respectively coarse and fine adjustment of the alignment of the interferometer relative to the reference sphere. Fine translation of the interferometer is achieved using two finely threaded screws 21 and 22. Also mounted on the flexure stage are the fibre-optic light delivery and interferometer signal recovery optics 23, 24 and 25 and the position sensitive detector 26.

The flexure stage is fixed by its central portion 27 to the translation stage 15. The translation stage provides a means of adjusting the focus of the interferometer measurement beam onto the reference sphere. Adjustment is achieved using a micrometer 28. Springs 29 on either side of the carriage hold the translation stage onto the carriage.

Weights 30 are fixed to the carriage in such a way as to ensure that the center of gravity of the whole carriage assembly is located at the center of the reference sphere. This ensures that there is no horizontal component of the weight of the carriage that would tend to displace it from its fixed position by bending the supporting peg 3.

The nature and structure of the individual components described above will be immediately apparent to the person skilled in the art. It is therefore considered not necessary to describe each component in very specific detail.

The function of the interferometer is to measure displacement of the moving, retro-reflecting target relative to the reference sphere in the tracking station along the line joining their centers. A polarising dual-frequency heterodyne interferometer configuration that achieves this is illustrated schematically, in FIG. 6.

A commercial laser head and counter card (Zygo ZMI 2000) are used for laser source and interferometer signal processing respectively. The advantages of this system is that it is designed to accept an optical reference signal for the counter card via an optical fibre. The interferometer output signal can also be connected to the counter card by optical fibre.

The interferometer is mounted on the moving carriage of the tracking station. For this reason, the laser source cannot be fed directly to the interferometer, so a polarisation-maintaining fibre is used to launch the two orthogonal polarisations into the interferometer. Disturbances of the polarisation maintaining fibre due to, for example, thermal drift or mechanical motion will induce mixing of the two orthogonal polarisations within the fibre. To prevent this mixing from affecting the accuracy of the displacement measurement, a counter reference signal is extracted at the interferometer by beam-splitter BS(I). In this way, the effect of polarisation mixing is common to the reference counter signal and to the measurement counter signal and are thus eliminated. This signal is fed via an optical fibre to the reference count input on the counter card.

Polarising beam-splitter PBS separates the two orthogonal polarisations. One goes straight through as a reference. The second is sent via a quarter-wave plate to the reference sphere, back through the quarter-wave plate to PBS. Each pass through the quarter-wave plate which rotates the polarisation state of the beam through 45° so that the beam then passes through PBS and a second quarter-wave plate to the moving target. The target retro-reflects the beam back through the quarter-wave plate which ensure that on hitting PBS, the beam is reflected out to interfere with the reference beam. The measurement signal produced by this interference is transmitted via optical fibre to the measurement count input on the counter card.

A third beam-splitter, BS(II) is used to direct a fraction of the return beam from the target to a position-sensitive detector PSD which provides position feedback for the tracking servo.

Figure 7:
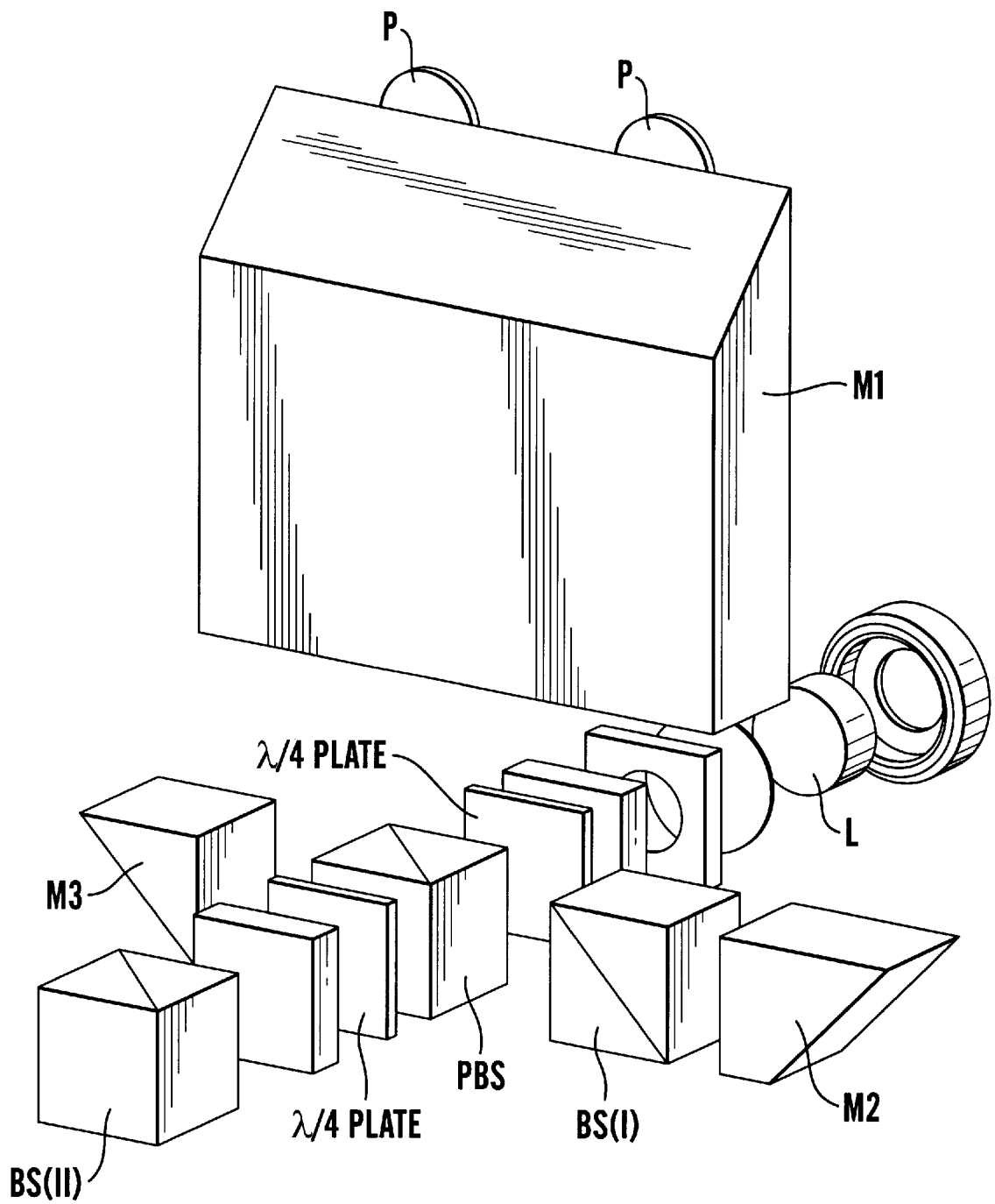
FIG. 7 is an exploded view of the filters and mirrors of the interferometer of FIG. 6.

A practical implementation of this interferometer is shown in exploded form in FIG. 7. The 45° mirrors M1, M2 and M3 are used to steer the beams out of and into the fibres located above the carriage.

In another embodiment, instead of having a spherical guide, the system is provided with a circular cylindrical guide movable around a single axis of rotation. The circular cylindrical guide provides both the mechanical center of rotation and the measurement datum, in a similar manner to the spherical guide. The structure of this alternative embodiment will be immediately apparent to the skilled person having regard to the above teachings.

I claim:

1. A tracking system for determining the position of a point relative to a datum, the point being located on a target, said tracking system comprising:

a spherical guide; and a carriage adapted and arranged for rotating about at least a portion of said spherical guide, said carriage having a beam generating device and a displacement measuring device mounted thereon, said beam generating device being configured to generate a beam, said beam being directed toward said spherical guide and, after reflection therefrom, toward the target, said displacement measuring device being configured to receive at least a portion of said beam after said beam is reflected from the target such that said tracking system measures displacement of the target from said spherical guide, said spherical guide corresponding to the datum.

2. A tracking system according to claim 1, wherein said displacement measuring device includes an interferometer.

3. A tracking system according to claim 1, wherein said spherical guide has a center point, and said beam generating device is configured to focus said beam at said center point of said spherical guide when said tracking system measures displacement of the target from said spherical guide.

4. A tracking system according to claim 1, wherein said spherical guide has an exterior surface, and said beam generating device is configured to focus said beam onto said exterior surface of said spherical guide when said tracking system measures displacement of the target from said spherical guide.

5. A tracking system according to claim 1, wherein said carriage includes means to support said carriage, and wherein mechanical center of rotation of said carriage and the datum coincide at a point.

6. A tracking system according to claim 5, wherein said spherical guide has a center point, and wherein the mechanical center of rotation of said carriage and the datum coincide at said center point of said spherical guide.

7. A tracking system according to claim 2, wherein said interferometer is configured to be arranged between said spherical guide and the target when said tracking system is measuring displacement of the target from said spherical guide such that said beam passes from said interferometer along a first path, is reflected by said spherical guide and then is directed back toward said interferometer along a second path, and then toward the target.

8. A tracking system according to claim 7, wherein said first path and said second path are coextensive.

9. A method for determining the position of a target relative to a datum comprising the steps of:

providing a spherical guide having a center point;

generating a beam;

directing the beam toward the spherical guide along a first path such that the beam reflects off the spherical guide and toward the target;

receiving at least a portion of the beam reflected from the target; and interpreting the at least a portion of the beam received from the target.

10. A method according to claim 9, wherein the step of directing the beam comprises passing the beam reflected off the spherical guide through an interferometer.

11. A method for determining the position of a target relative to a datum comprising the steps of:

providing a spherical guide having a center point;

disposing an interferometer at a first distance from the center point;

generating a beam; and directing the beam from the interferometer and toward the center point of the spherical guide such that the beam is reflected by an exterior surface of the spherical guide, thereby allowing the beam to be directed through the interferometer and toward the target.

12. A method according to claim 11, wherein the step of directing the beam comprises focusing the beam at the center point of the spherical guide.

13. A method according to claim 9, wherein the step of directing the beam comprises focusing the beam at the exterior surface of the spherical guide.

* * * * *